C. & A. SPRING.
Children's Carriage.
No. 62,976.
Patented Mar. 19, 1867.
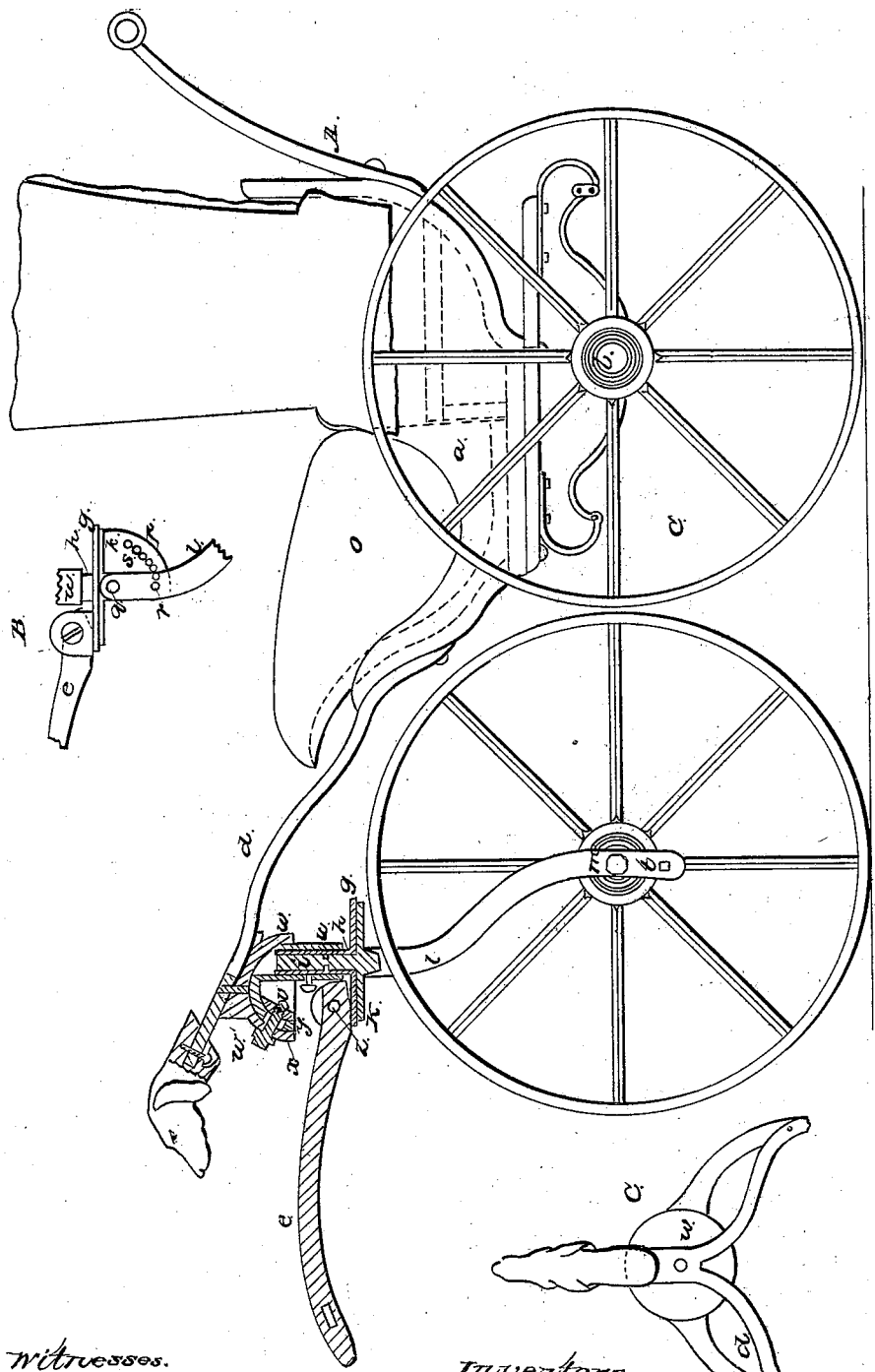

United States Patent Office

CHARLES SPRING, OF DORCHESTER, MASSACHUSETTS, AND ANDREW SPRING, OF WESTON, MASSACHUSETTS.

*Letters Patent No. 62,976, dated March 19, 1867.*

IMPROVEMENT IN CARRIAGES FOR CHILDREN.

*The Schedule referred to in these Letters Patent and making part of the same.*

TO ALL WHOM IT MAY CONCERN:

Be it known that we, CHARLES SPRING, Dorchester, Norfolk county, and ANDREW SPRING, Weston, Middlesex county, all in the State of Massachusetts, have invented an improved Child's Carriage; and we do hereby declare that the following, taken in connection with the drawings which accompany and form part of this specification, is a description of our invention sufficient to enable those skilled in the art to practise it.

The invention relates to the construction of that class of carriages for children in which the front portion of the body is supported by a third or leading wheel. As usually applied, this leading wheel is made to run in and only in a vertical plane parallel to the planes of the main wheels, or if allowed to turn on a vertical axis or journal pin, this axis is placed directly over the horizontal axis on which the wheel turned.

The object of our invention has been to so connect this wheel with the carriage body or frame that it will immediately accommodate itself to any direction in which the carriage is turned, or be brought into a plane corresponding with this turning movement without lifting the wheel from the ground, or applying force thereto other than the direct force used in propelling the carriage. This is accomplished by connecting the leader wheel to the carriage frame by means of a vertical rotary axis placed out of the vertical plane of the axis of the wheel, so that in propelling the carriage the axis of this wheel shall always follow behind the vertical axis, the journal boxes of the wheel turning whenever the direction of movement of the carriage is changed.

Our invention, therefore, consists primarily in combining with the carriage body and its two main wheels and stationary axle, a third or leader wheel whose journals form part of a rotary frame or yoke, having a vertical axis turning freely in a bearing arranged out of vertical line of the horizontal axis on which the wheel turns.

A, in the drawing, represents, partly in elevation and partly in central section, a carriage embodying the invention. B is a side view of inner end of pole and adjacent parts. C, a plan of front end of the frame connecting the carriage body and leader wheel. The carriage body $a$, axle $b$, and main wheels $c$, do not differ in their construction or arrangement from other carriages of this class. At the front of the carriage is a frame, $d$, with which is indirectly connected a pole, $e$, for drawing the vehicle, and at the rear of the carriage is a horizontal bar, $f$, for pushing the carriage. Fixed to or below the under side of the frame $d$, at the front end thereof, is a circular bearing plate, $g$, having a tubular spindle, $h$, in which is journalled a vertical rotary shaft or pin, $i$, extending from a plate, $k$, fitting in or against the plate $g$, the plate $k$ being fixed to and so as to form part of a yoke, $l$, straddling the wheel, and having at the lower ends of its two arms bearings for the axle $m$ of a leader wheel, $n$. The shaft $i$ being maintained in vertical position by the fixed position of the tubular spindle $h$, the arms of the yoke $l$ are curved or inclined, so that the axle $m$ is journalled out of vertical line of the shaft $i$, as seen at A, the distance between the perpendicular line of the shaft $i$, and the axle $m$, being such, that in whatever direction the shaft $i$ is propelled, and however this direction is changed, the yoke $l$ swings round so as to follow the shaft $i$, enabling the carriage to be turned with perfect ease and in either direction without lifting the wheel, and whether the carriage be drawn from the front or pushed from behind. In order to bring the shaft $i$ into vertical position in using leader wheels of different diameter, the arms of the yoke $l$ are secured to vertical plates $p$, (forming the ends of the cross-piece making the top of the yoke) by screws $q$, (as seen at B,) turning on said screws, and being adjusted in position by screws $r$, and a series of adjusting holes $s$. The lower ends of the yoke arms may be provided with a series of holes $t$, by which the front end of the carriage may be set higher or lower with the same wheel (by shifting the axle,) or may be maintained at the same position in using different leader wheels. For adjusting the shaft $i$ vertically, both in the plane of the wheel and in a plane transversely thereto, the spindle $h$ is set in a tube, $u$, projecting from a hemispherical ball-piece, $v$, setting in a corresponding hemispherical socket, $w$, fixed to the frame $d$, the ball-piece $v$, and socket-piece being connected together by a screw, $w'$, which extends through a slot, $x$, in the ball-piece, and into a nut, $y$. For accommodating the position or height of the pole to the person drawing the carriage, it is so applied to the carriage by a connecting-pin, $z$, as to be capable of a vertical movement. In order, however, to enable the carriage to be easily controlled in sinking into depressions, and riding over obstructions, the extent of vertical movement of the pole is limited by constructing the pole with a rear extension bringing up against the plate $g$ when the pole is raised, and so applying the pole that it rests against the plate $g$ in front of the pin $z$ when the pole falls. When reaching a depression, by lifting the pole, the rear extension comes against the plate $g$, and allows the front wheel and forward part of the carriage body to be lifted until the depression is passed, while in passing over an obstruction the wheel may be similarly raised, or if the wheel is allowed to roll over the obstruction it will do so without disturbing the front of the pole. In order to constitute the carriage body into a crib, (an arrangement that is found very convenient,) we combine with the front part of the body a box, $o$, having on each side a guard or wall, the box fitting down into the body, as shown by the dotted lines at A, so that when pillows are arranged in the carriage, a secure crib is formed in which a child may rest in comfortable position and without danger of falling out.

We claim, in combination with the body, stationary axle, and two main wheels of a child's carriage, a leader wheel, $n$, whose axis is supported in journals arranged out of line with the shaft $i$, substantially as shown and described.

We also claim the means or mechanism for relative adjustment of the shaft $i$, and axle $m$, and for changing the position of the axle, substantially as described.

Also the arrangement of the pole so as to be capable of a vertical swinging movement when this movement is fixed and determined, substantially as set forth.

Also combining with the carriage body the crib box $o$, substantially as described.

CHARLES SPRING,
ANDREW SPRING.

Witnesses:
   J. B. CROSBY,
   F. GOULD.